(12) United States Patent
Dix

(10) Patent No.: US 7,747,370 B2
(45) Date of Patent: Jun. 29, 2010

(54) METHOD FOR CREATING END OF ROW TURNS FOR AGRICULTURAL VEHICLES

(75) Inventor: Peter J. Dix, Naperville, IL (US)

(73) Assignee: CNH America LLC, New Holland, PA (US)

( * ) Notice: Subject to any disclaimer, the term of this patent is extended or adjusted under 35 U.S.C. 154(b) by 562 days.

(21) Appl. No.: 11/695,799

(22) Filed: Apr. 3, 2007

(65) Prior Publication Data

US 2008/0249692 A1 Oct. 9, 2008

(51) Int. Cl.
*G06F 7/70* (2006.01)
(52) U.S. Cl. .......................... 701/50; 701/23
(58) Field of Classification Search .............. 701/23, 701/50
See application file for complete search history.

(56) References Cited

U.S. PATENT DOCUMENTS

| | | | |
|---|---|---|---|
| 4,600,999 A | 7/1986 | Ito et al. | |
| 6,236,924 B1 | 5/2001 | Motz et al. | |
| 6,463,374 B1 * | 10/2002 | Keller et al. | 701/50 |
| 6,643,576 B1 * | 11/2003 | O Connor et al. | 701/50 |
| 6,671,582 B1 | 12/2003 | Hanley | |
| 6,728,607 B1 | 4/2004 | Anderson | |
| 6,876,920 B1 * | 4/2005 | Mailer | 701/207 |
| 6,934,615 B2 | 8/2005 | Flann et al. | |
| 7,451,030 B2 * | 11/2008 | Eglington et al. | 701/50 |
| 7,502,678 B2 * | 3/2009 | Diekhans et al. | 701/50 |
| 2003/0187577 A1 * | 10/2003 | McClure et al. | 701/213 |
| 2004/0006957 A1 | 1/2004 | David Sheidler et al. | |
| 2004/0193348 A1 * | 9/2004 | Gray et al. | 701/50 |
| 2005/0273253 A1 | 12/2005 | Diekhans et al. | |
| 2006/0064216 A1 | 3/2006 | Palmer | |
| 2006/0178820 A1 * | 8/2006 | Eglington et al. | 701/209 |
| 2006/0241838 A1 | 10/2006 | Mongiardo et al. | |
| 2007/0198159 A1 * | 8/2007 | Durkos et al. | 701/50 |
| 2007/0233348 A1 * | 10/2007 | Diekhans et al. | 701/50 |
| 2007/0233374 A1 * | 10/2007 | Diekhans et al. | 701/209 |
| 2008/0004778 A1 * | 1/2008 | Rekow | 701/50 |
| 2008/0103690 A1 * | 5/2008 | Dix | 701/207 |
| 2008/0103694 A1 * | 5/2008 | Dix et al. | 701/213 |
| 2008/0147282 A1 * | 6/2008 | Kormann | 701/50 |
| 2008/0249692 A1 * | 10/2008 | Dix | 701/50 |
| 2009/0118904 A1 * | 5/2009 | Birnie | 701/41 |

* cited by examiner

*Primary Examiner*—Khoi Tran
*Assistant Examiner*—Brian J Broadhead
(74) *Attorney, Agent, or Firm*—Patrick M. Sheldrake; John William Stader; Michael G. Harms (57) ABSTRACT

A GPS-based vehicle guidance system and a method for automatically guiding a vehicle through and end of a row turn. The present invention provides a method and system that automatically guides the vehicle through an end of row turn without manual control. An algorithm using the minimum turning radius of the vehicle and the rate of change of the vehicle creates a set of interpolated data points resulting in an end of row turn.

17 Claims, 6 Drawing Sheets

METHOD FOR CREATING END OF ROW TURNS FOR AGRICULTURAL VEHICLES

BACKGROUND OF THE INVENTION

The present invention relates generally to GPS-based vehicle guidance systems and more particularly to a method for automatically guiding a vehicle through and end of a row turn without engaging a manual mode of operation.

Tractors and other off-road work vehicles in the agricultural, mining and construction industries have typically operated with manual steering by the operator. Recent changes in control systems and the development of satellite-based navigation (GPS) systems, including those incorporating differential correction systems, have allowed tractors to operate in semi-automatic or fully automatic steering modes. Combining satellite navigation and ground-based navigation input signals precisely identifying vehicle position and speed with sophisticated on-board vehicle electronic control systems allow the tractor to steer itself with a high degree of accuracy when traversing terrain. The result is that precision farming practices are transitioning from a luxury to a necessity, capable of improving efficiency and yield in common farming operations, such as tilling, seeding, fertilizing, spraying and harvesting.

To provide this control, the prior art teaches using satellite positioning information by an on-board vehicle navigation control system to accurately determine and control a vehicle's position while operating in a field. The operator will typically enter the planned route of the tractor, or let the control system determine the most efficient route. The control methods are well known in the art, and may involve multiple position transmitters or receivers, with various signals used to derive vehicle location, elevation, direction of travel (vehicle heading), attitude and speed.

The task of precision guidance of an agricultural vehicle involves not only accurately determining vehicle position in a field, but also defining an efficient array of paths to be followed by the vehicle that will, in conjunction with the swath path of an associated implement, create an overall swath path pattern that efficiently and effectively covers the crop area of a field. The pattern must be located and oriented on the field, and the physical characteristics and limitations of the vehicle and coupled implement must be identified and provided to the navigation system. Implement or header width, location of the implement or header with respect to the vehicle, and limitations on vehicle and associated implement movement, such as minimum turning radius, must also be considered. With this information, it is possible to define a series of swath paths for the vehicle to travel in an attempt to cover all cultivatable portions of a field without unnecessary gaps or overlaps.

Calculating the series of paths needed to cover an area without substantial gaps or overlaps is relatively straightforward when straight paths can be used; however, not all fields can be covered in this manner. Many fields require the use of paths having a curvature that varies along at least some portion of its length, whether to follow irregularly shaped boundaries, avoid obstacles within the field, follow topographic contours of the ground, implement agronomic farming practices, or to contour the ground for irrigation. Such conditions preclude a complete reliance on geometrically predefined paths, such as straight lines or constant radius curves. In order to provide generally equally spaced swath paths, the path of each adjacent swath path must change slightly compared to the prior swath path as the vehicle moves generally transversely across the field (i.e., from one swath path to the next) the radius of each curved portion of the swath path varies slightly from the adjacent swath path.

Vehicle guidance systems must be able to store and retrieve swath path information as well as determine new adjacent swath paths from a baseline swath path or create new swath paths from defined starting and ending positions. The number of swath paths to be stored and/or determined increases as the size of the field increases. For swath paths that include variable curvature along their length, the number of positional data points necessary to fully define the swath path between starting and ending points is significantly increased compared to using only starting and ending position points to create straight-line paths. The systems must also quickly present swath path and control information to the operator in an easily understood and useful manner, which requires computational efficiency. As the vehicle operator positions the vehicle near the start of a swath path and prepares to engage the vehicle navigation system, the system must quickly determine if a swath path has been stored in system memory or can be calculated from a swath path stored in system memory and then direct the vehicle to the closest, presumably most appropriate path. If no swath paths are stored in the system memory, then the system must alert the operator and direct the recording of a new swath path or allow the operator to provide a stored swath path from another memory source (i.e., change the removable memory media to one having stored swath path information).

Satellite-based vehicle guidance systems may periodically experience signal drift. Vehicle position signal drift introduces differences between the actual vehicle position and the vehicle position sensed by the vehicle guidance system. In precision farming applications, even slight discrepancies can have significant impact on the swath pattern in a field. As a result, vehicle guidance systems must be able to compensate for signal drift, adjusting the vehicle position sensed by the guidance system to match actual vehicle and implement position in the field.

It would be a great advantage to provide a method for implementing the automatic swath path guidance system and method described above for "end of row turns". What is meant by end of row turns are the paths a vehicle must travel at the end of each swath path when aligning with the next swath path. More specifically, an end of row turn is a path that connects predefined end points of equally spaced swath paths, construced iteratively from a baseline swath path. Currently, the operator is required to have manual control over the vehicle during end of row turns and must align the vehicle with the next swath path based on visual guidance and little help from the automatic guidance system. It would be advantageous to have a method that would allow the guidance system to automatically control the vehicle through an end of row turn and produce more efficient and aligned swath paths.

SUMMARY OF THE INVENTION

One embodiment of the present invention is a method for guiding a vehicle including the steps of providing a vehicle with an associated implement, providing a vehicle guidance system having a vehicle position receiver and providing a swath generation apparatus (SGA) having a processing capability and an SGA memory device being communicatively coupled to the guidance system. In addition, the method includes the steps of providing an operator input device, communicating a set of predetermined parameters to the SGA and defining within the SGA a coordinate system for vehicle position. Further, the method includes the steps of determining a planned end of row turn path for the vehicle by connecting predefined end points of non-intersecting swath paths, based on the predetermined parameters and an actual position of the vehicle and guiding the vehicle along the planned end of row turn path.

Another embodiment of the present invention is a method for guiding a vehicle including the steps of providing a vehicle with an associated implement, providing a vehicle guidance system having a vehicle position receiver and providing a swath generation apparatus (SGA) having a processing capability and an SGA memory device being communicatively coupled to the guidance system. The method also includes the steps of providing an operator input device, communicating a set of predetermined parameters to the SGA, defining within the SGA an coordinate system for vehicle position and determining a planned end of row turn path based on the predetermined parameters and the vehicle position. Further, the method also includes the steps of displaying the vehicle path on a display device, providing an option to manually guide the vehicle along an alternate vehicle path and guiding the vehicle along the planned end of row turn path.

Yet another embodiment of the present invention includes a vehicle guidance system having a vehicle with an associated implement, a vehicle guidance system having a vehicle position receiver, and a swath generation apparatus (SGA) having a processing capability and an SGA memory device being communicatively coupled to the guidance system. In addition, the system includes an operator input device being configured to receive a set of predetermined parameters to the SGA and define a coordinate system for vehicle position and determine a planned end of row turn path based on the predetermined parameters and the vehicle position. The vehicle guidance system provides automatic guidance of the vehicle along the planned end of row turn path.

Another advantage of the present invention includes entering the limit of the radius of curvature used for the end of row turns to allow for more efficient turning of the vehicle.

Yet another advantage of the present invention includes automatically turning the vehicle at the end of the row without the operator having to engage in manual operation of the vehicle.

Still another advantage of the present invention includes providing a predetermined path for the vehicle to travel at the end of row turn.

Yet another advantage of the present invention includes pre planning the swath paths and end of row turns with intermediate points spaced generally three to ten meters apart that are interpolated as the vehicle drives.

Another advantage of the present invention includes having an operator consultation with the control system before making the automatic end of row turn for safety reasons.

Yet another advantage of the present invention includes checking the end of row path against boundary lines or completed areas.

One other advantage of the present invention includes providing a warning if the pre-planned end of row path cannot be followed so that the operator may take manual control of the vehicle.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Any reference herein to the terms "left" or "right," "up" or "down," or "top" or "bottom" are used as a matter of mere convenience, and are determined by standing at the rear of the vehicle facing in its normal, or forward, direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail.

The swath generation methodologies described herein may find application in precision agriculture systems used to control crop spraying operations, harvesting operations, cultivation and plowing operations, planting and seeding operations, fertilizer application, or other operations where highly accurate positioning information is used in conjunction with defined patterns of swath paths to control transit of a vehicle over a land area. Such systems for precision location determination are generally well known and are exemplified by those disclosed in U.S. Pat. No. 6,199,000 and U.S. Pat. No. 6,553,299, each entitled "Methods and Apparatus for Precision Agriculture Operations Using Real Time Kinematic Global Positioning Systems" both of which patents are incorporated by reference herein in their entirety. Although the various methods will be described with particular reference to GPS satellite-based systems, it should be appreciated that the teachings are equally applicable to guidance systems using other methods to determine vehicle position.

Figure 1:
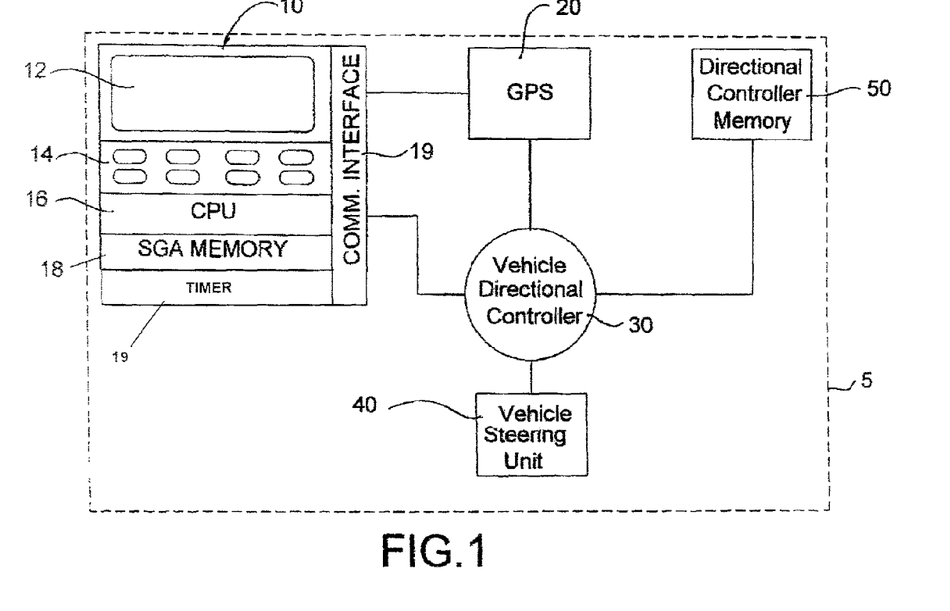
FIG. 1 illustrates a schematic diagram for a typical GPS-based vehicle guidance system of the type the present invention is useful.

An automatic GPS-based vehicle guidance system 5, seen schematically in FIG. 1, is located on an agricultural tractor or similar prime mover to simplify the task of driving the vehicle. It should be understood that the use of a tractor in this specification is for example purposes only, and any suitable vehicle may be used with the present invention. The vehicle guidance system 5 is located on a tractor and includes a directional controller 30, a global positioning system receiver (GPS) 20, a swath generation apparatus (SGA) 10, and a steering unit 40 communicatively coupled in a manner that enables each to send and receive data and/or control signals. The steering unit 40 preferably includes proportional or directional control valves that are hydraulically connected to a steering actuator for the tractor. The vehicle guidance system 5 continually calculates a vehicle steering heading by comparing vehicle position and directional heading to a desired travel path provided by the SGA 10, and sends the vehicle steering heading to the steering unit 40, which in turn actuates vehicle steering, thereby changing the vehicle heading. The vehicle navigation system 5 may further include other sensors, such as vehicle yaw and roll, implement hitch angle, and the like, which would also be communicatively coupled to the vehicle guidance system 5 and adjust the vehicle position signal to compensate for such vehicle movements. Though shown as discreet devices, the functions of the directional controller, swath generation apparatus, and other portions of the vehicle guidance system can easily be integrated into a single apparatus within the intent of this invention.

The directional controller 30 is typically a microprocessor-based apparatus that receives near real-time position information from the GPS 20, compares the then-current vehicle position with the intended position along a swath path (provided by the SGA 10), and directs an output signal to the vehicle steering unit 40 to cause the vehicle to be steered toward the intended position. The vehicle guidance system 5 shown is representative of numerous GPS-based vehicle guidance systems in which a SGA 10 incorporating the present invention may prove useful.

The SGA 10 is preferably mounted inside the operator compartment of the tractor to be easily accessible to the operator. The SGA 10 preferably includes a visual display 12 and an operator input device 14 to enable the operator to interface with the vehicle guidance system 5, and a microprocessor (CPU) 16, an SGA memory 18, and a communication interface 19 that allows the SGA 10 to communicate with other components of the vehicle guidance system 5. The operator input device 14, of which examples include keyboards, touchpads, joysticks, and the like, may be integrated into the visual display 12 (e.g., a touch-screen) so that task-specific "keys" can be easily provided in a compact format or modified by software changes. The SGA memory 18 preferably comprises a removable memory media for all or a portion of the total SGA memory that allows stored swath path information to be conveniently moved and shared among multiple vehicles or with other computer system (e.g., an office computer system). When removable media is utilized, the SGA memory 18 may function as yet another variation of the operator input device 14. The SGA 10 provides computational capability thereby allowing the directional controller 30 to be dedicated to the task of guiding the vehicle along a desired swath path determined by the SGA 10. The primary tasks of the SGA 10 are: to memorize a baseline swath; efficiently store the position data for points along the baseline swath path; generate additional, generally parallel swath paths that, in the aggregate, define a swath pattern that covers the crop growing area of a field; and efficiently communicate the swath path information, as needed, to the directional controller 30. The SGA 10 is also tasked with accepting operator inputs that may require changes to a baseline swath path and efficiently recreating a revised baseline swath path from which other swath paths may be created. These changes may be in the form of a "nudge" that alters the swath path to compensate for variations in the vehicle position signal or a lateral shift of the swath path needed to adjust the swath path for implements of differing widths.

The SGA 10 is configured to receive information about the field to be processed from the operator and to selectively transmit the swath path definition information to the directional controller 30. Input information may include field information (e.g., name, location, size, and boundary locations), the operations to be performed, the implements to be used while processing the field, and the geometry of each implement. Input information may be manually input via the operator input device 14, but is more conveniently transferred into the SGA using a removable module for the SGA memory (e.g., a portable memory card) so that the operator can select from stored information. Information can be entered into portable memory cards by numerous means, including computers, which offer greater ease and efficiency for such operations compared to performing them while seated in the vehicle ready to commencing farming operations. In an alternate embodiment, common wireless technology is used to transmit general input information and a baseline swath path definition to the SGA further enhancing the SGA's ability to share stored swath path information.

With basic information about a field entered, including a baseline swath path, the operator may select a desired swath path and swath pattern type from those available in SGA memory 18. Alternatively, the operator may choose to define and store a new swath path and/or swath pattern in the SGA memory. Once a baseline swath is identified or selected, the SGA 10, in accordance with its internal programming, will create a swath pattern comprising a series of additional swath paths that will, as a whole, define a series of swath paths that, based on specific vehicle and implement characteristics, cover substantially all of the crop growing area of a selected field. All swath paths are not necessarily created and retained in SGA memory. A limited number of the total number of swath paths that are needed are created by the SGA. Then, based on movement of the vehicle in the field, the SGA calculates additional swath paths when needed, as the vehicle travels the previously created ones. As the vehicle is positioned near an end of a swath and the vehicle guidance system is engaged, information defining the desired swath path is communicated by the SGA 10 for use by the directional controller 30 to manage vehicle movement along the desired path. The rate of communication of swath path information may be varied so that the SGA 10 provides swath path position data points at an optimal rate for the directional controller used in the vehicle guidance system.

Figure 2:
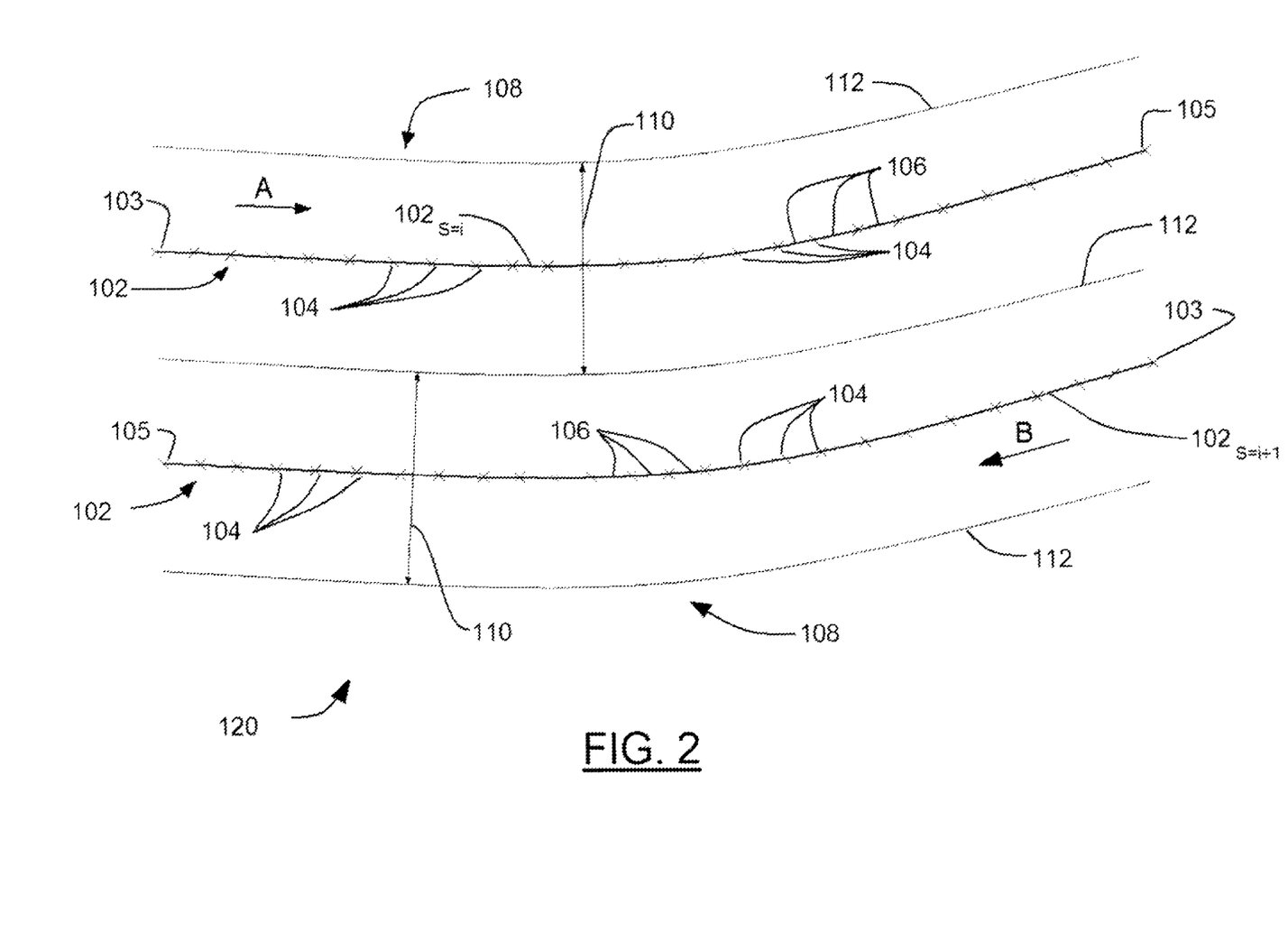
FIG. 2 illustrates a portion of a pair of swath paths and illustrates the nomenclature used in a curved swath path generation method and apparatus.

Referring now to FIG. 2, there is shown a portion of a typical curved swath arrangement in a field. A swath 108 is created when an implement having an effective working (swath) width 110 traverses a swath path 102 over the ground. The implement (e.g. tiller, seed planter, fertilizer, harvester, sprayer, etc . . . ) may be a single-use self-propelled unit, or may be pushed, towed, or otherwise connected to a prime mover traversing the swath path 102. Swath paths 108 are defined by a plurality of position data points 104 spanning from a beginning position 103 to an end position 105. Swath segments 106 connect adjacent pairs of position data points 104 along each swath path 102. A swath pattern 120 is comprised of one or more swath paths arranged so that substantially all of the tillable area of a field is covered by the swath paths 108, shown as swath paths $102_{S=i}$ and $102_{S=i+1}$. In an agricultural application, a farmer typically processes a field in long swath paths, turning at the end of a first swath after having traversed the swath, and returning to the starting end of the field along a second swath path that may be adjacent to the first swath path depending upon the swath pattern used. The object is for the swath pattern to cover as much of the crop planting area of the field as is practical while minimizing the portions of the area that are covered multiple times.

A major component of guiding a swath path through a field involves the end of row turns. Typically, operators must take manual control at the end of row and for end of row turns, to turn the vehicle around and align it with the next swath path.

At the end of the row, the vehicle may pass over ground already covered in work mode or ground that will be covered later in work mode. Work mode may include, but is not limited to, planting, harvesting, seeding, applying and spraying.

In general, vehicles cannot be turned too tightly if connected to an implement because the implement may hit the vehicle, or the vehicle or implement may not operate properly or as intended. Typically, end of row turns are kept in alignment and do not overlap, however, in the present invention the end of row turns are permitted to overlap each other, since the work mode is not active. This typically means that the implement is raised or shut off during the end of row turns, and no work is being performed. The present invention allows the user to maintain an automatic mode of operation active through an end of row turn as the guidance control system directs the vehicle through the turn based on parameters the operator has previously inputted and on the algorithms described above for determining curved swath paths. One of the parameters the operator enters is the minimum turning radius for the vehicle and implement combination. The limit on the radius of curvature used for the end of row turns may be different than the minimum turning radius used for generating parallel swath paths, since the implement is raised during end of row turns. The operator may input many other parameters to assist the system in controlling and determining the end of row turn path for the vehicle, such as the rate of change of the vehicle. The algorithm will consider the operator's inputs for both the minimum turning radius and the rate of change of the vehicle to guide the vehicle through the end of row turn.

Figure 3:
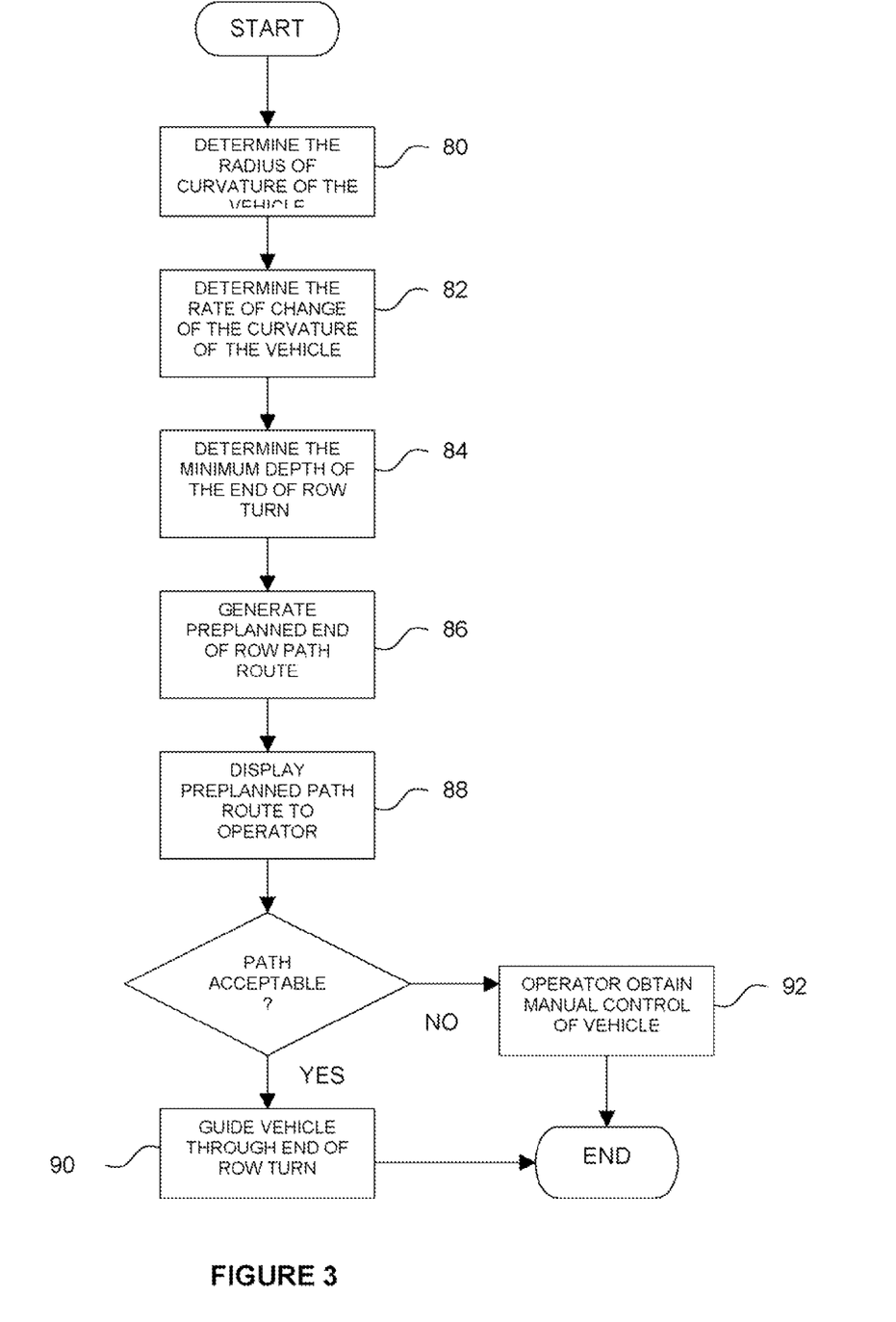
FIG. 3 illustrates the method for determining the end of row turn path based on operator-entered criteria.

The method for automatically guiding a vehicle through an end of row turn or the present invention is based on several criteria and is shown in a flow chart in FIG. 3. The operator is prompted to enter the criteria before the vehicle begins along the swath paths and into the field or work area. For determining paths for end of row turns in the present invention, a turn cannot be greater than a specified radius of curvature for a vehicle, therefore the system determines the radius of curvature of the vehicle in step 80. Next, the system determines the rate of change of the curvature of the vehicle in step 82, since the rate of change of curvature cannot exceed the capabilities of the vehicle. Next, in step 84, the minimum depth of the end of row turn is determined. The minimum depth of the end of row turn is also based on the amount of headland defined by the operator. It should be understood that the system determines the parameters including the radius of curvature, the rate of change of the vehicle and the minimum depth of the end of row turns by several different methods. For example, the system may prompt the operator to enter the information if not already saved in the system. In addition, the system may obtain this information from a series of menu options or set-up options that the operator navigates. The information may also be stored in the system where it is not necessary for the operator to re-enter the information.

The system accounts for and processes all of these criteria in step 86 and determines a preplanned end of row turn. The path of the turn is displayed in step 88 and the operator is able to view the preplanned route and determine if it is a route that is acceptable and a route that the operator desires to follow. If the operator determines that the generated path is acceptable, then the system automatically guides the vehicle through the turn at the end of row in step 90. If the operator determines that the generated path is not acceptable, then the operator must take manual control of the vehicle in step 92 and guide the vehicle through the end of row turn. In addition, the system will notify the operator that manual control must be used to guide the vehicle through the turn if the system determines that the vehicle would go outside of the headlands or if the implement would go outside of the boundary lines. The operator may also disengage the automatic mode of operation and take manual control to avoid obstacles in the way of the vehicle. If the operator does choose to use manual control of the vehicle, the operator can easily re-engage the automatic control once the obstacle is avoided, or once the operator chooses. The system will continue to automatically guide the vehicle as it was before the operator began the manual operation.

Figure 6:
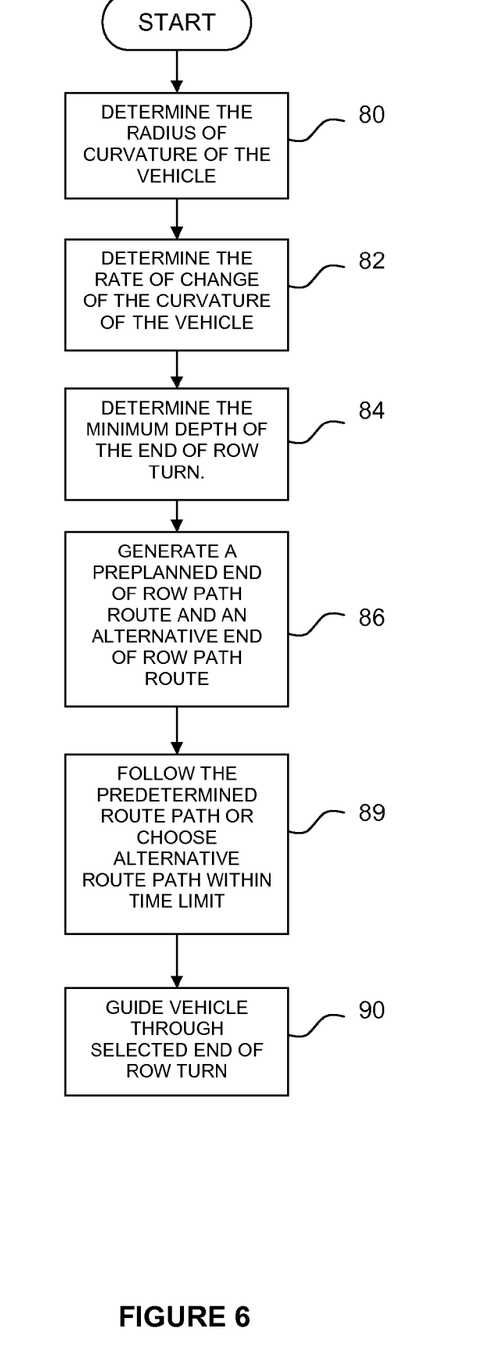
FIG. 6 illustrates an additional embodiment for determining end of row turn paths.

There are many reasons why an operator may choose to not follow the preplanned end of row turn path the system provides for the vehicle. For example, the path that is determined by the system may direct the vehicle in a direction opposite from the direction the operator wishes to travel. One embodiment of the present invention, may include a count down timer 19, as shown in FIG. 1, to provide notice to the operator of the time left to answer the prompt, before the system automatically engages in the predetermined end of row turn. The count down timer 19 displays the amount of time the operator has remaining to choose either to follow the predetermined path or to deviate from that path before the system automatically guides the vehicle through the predetermined end of row turn path, the default reaction for the method as shown is step 89 of FIG. 6. In addition, a notification may be used to indicate that the operator has run out of time in which to choose. This indicator may be in the form of an audible or visual signal or other suitable notification. The count down 19 timer may also be accompanied by an audible indicator in conjunction with the visual display to alert the operator that a limited amount of time for response remains, after which the vehicle will be automatically guided through the predetermined end of row turn.

The method also predetermines the end of row turns with target points that are between three to ten meters apart, and interpolates between the points as the vehicle progresses through the turn. Path definition for efficient system performance requires balancing the number of position data points needed to provide the desired directional control input to the directional controller against the burden on the computing and memory systems resulting from working with large amounts of positional data. Storing data for path position at this rate would require vast resources and burden system computations by using unnecessarily closely-spaced data points to define paths. Such closely spaced positional data points do not proportionally improve the system path-following capability. The recalled baseline swath path is optimized via an algorithm for the number of position data points defining the swath path. The present invention optimizes computational efficiency by limiting the number of position data points on a swath path such that position data points are spaced at least one meter apart and not more than twenty-five meters apart along the swath path. Excess position data points are removed from recalled swath paths having position data points spaced more closely than necessary. Additional position data points are created for swath paths having position data points spaced further apart than the target spacing using linear extrapolation between adjacent points. For agricultural applications, spacing is further limited to between approximately three and ten meters to provide sufficient curve definition for input to the vehicle guidance system.

The present invention may also include a function of the control system that prevents the path of the vehicle from driving outside of the headlands or work area boundaries of the field and/or prevents the vehicle from repeating swath paths on areas that have already been worked. The system provides a visual output of the area in which the vehicle is traversing, to which the operator has access. As the operator and vehicle traverse the field, the system tracks the progress and maintains a notification on the visual output for the operator. This notification may be, but is not limited to having color-coded maps of the work area, wherein one color indicates area traversed and worked by the vehicle, and another color indicates areas not yet traversed by the vehicle. This allows the operator to track the vehicle's progress as the vehicle automatically guides the system through the work area.

Figure 4:
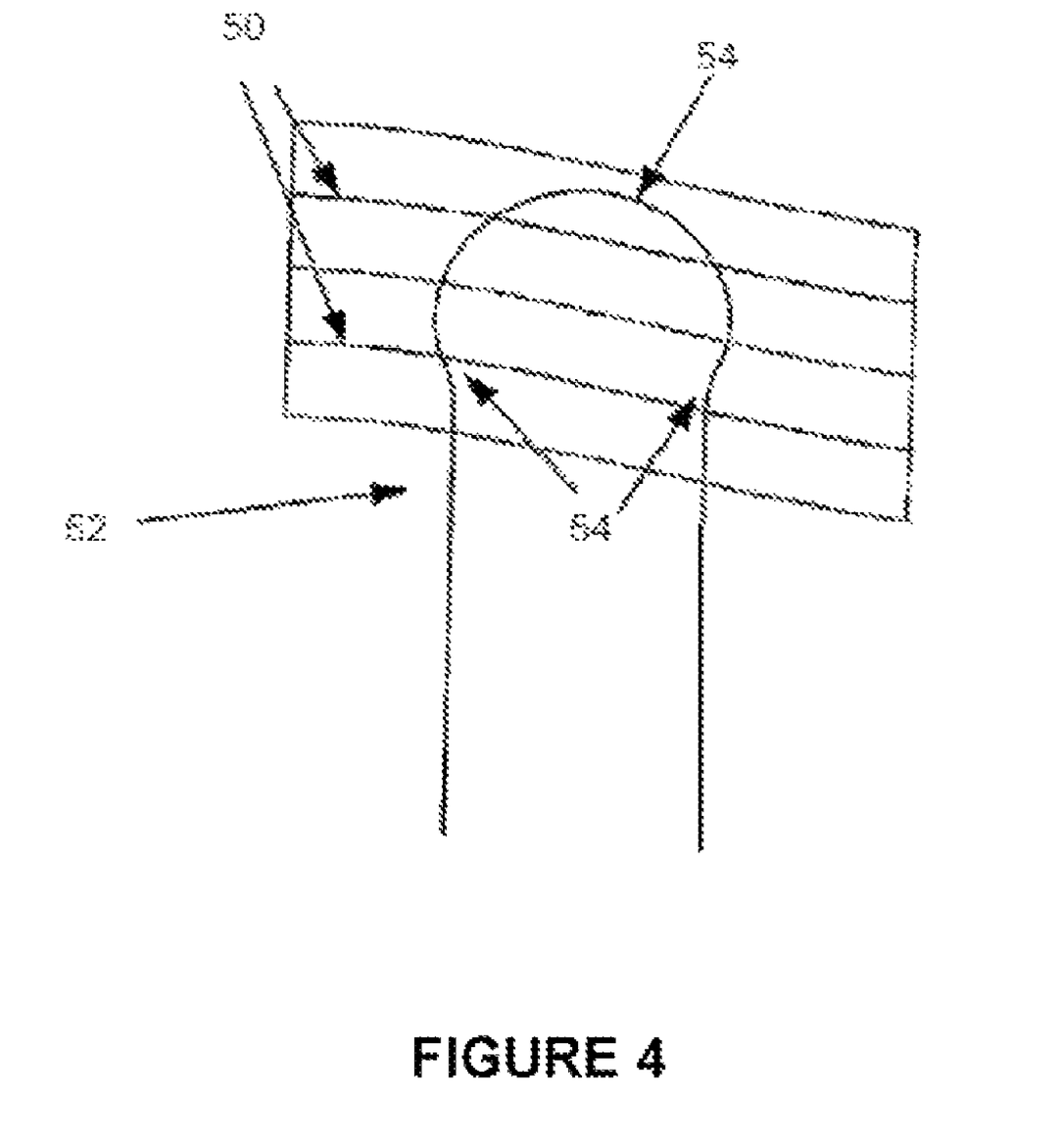
FIG. 4 illustrates an example of an end of row path of the present invention.
Figure 5:
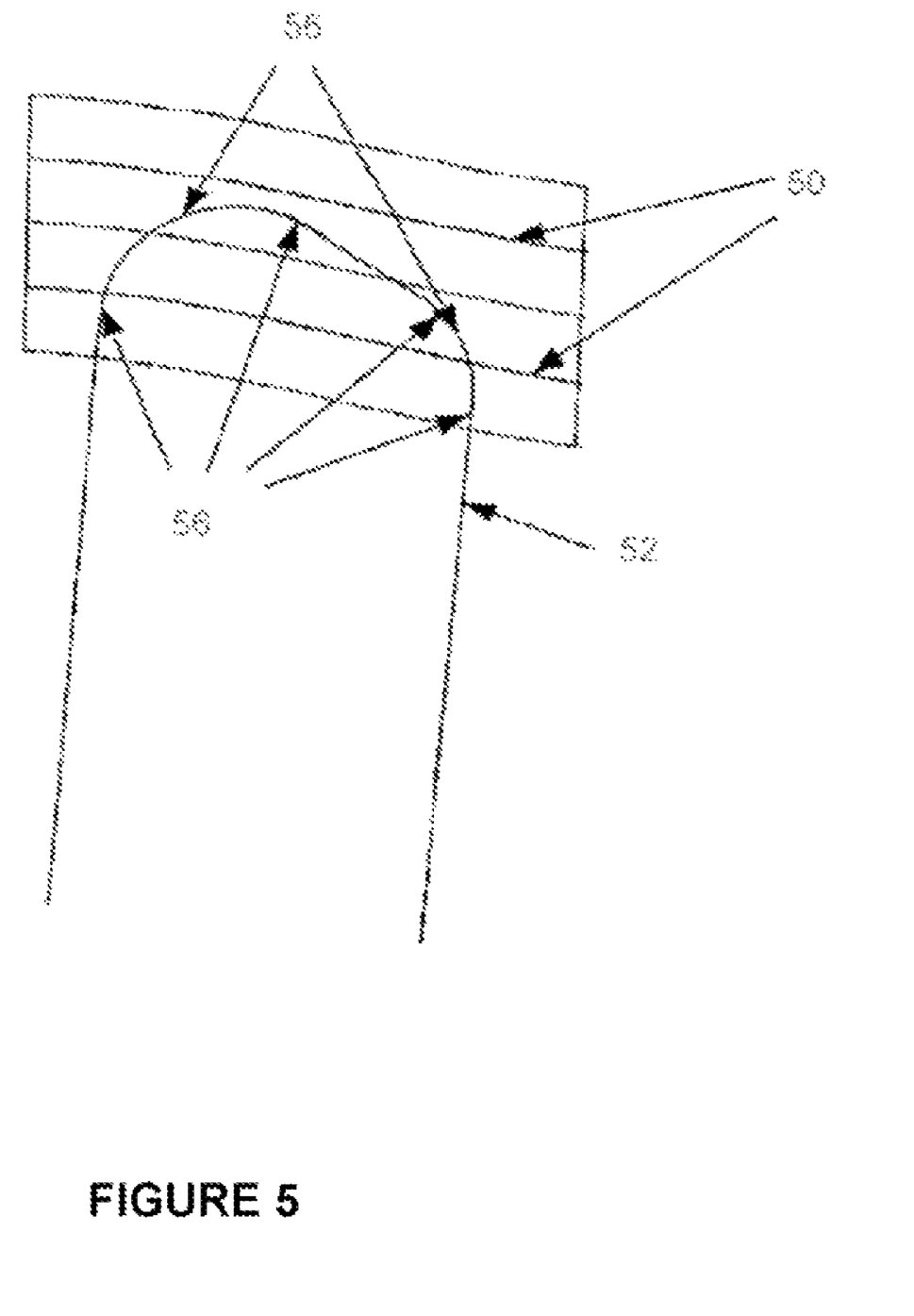
FIG. 5 illustrates an example of an end of row path of the present invention.

While many different paths may be followed and created by the control system for end of row turns, FIGS. 4 and 5 illustrate two examples of end of row turn paths the present invention may prepare for the vehicle. As shown in FIG. 4, a bulb shaped path 54 is produced when a minimum turning radius larger than half of the swath path width is used for the end of row turn. The radius of curvature is limited and constant. The headland swath paths 50 are created to provide room to make the end of row turn and are recorded by the control system. The control system uses the stored headland swath path 50 information to ensure that the end of row turn is only made in the headland swath 50 area and does not cross outside of the boundaries into work area 52. As shown in FIG. 5, a more undefined shape 56 is produced for the end of row turn when a minimum turning radius smaller than ½ the swath path width is used. As with FIG. 4, the headland swath paths 50 are created to provide room to make the end of row turn and are recorded by the control system. The control system uses the stored headland swath 50 information to ensure that the end of row turn is only made in the headland swath 50 area and does not cross outside of the boundaries into work area 52.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for guiding a vehicle comprising the following steps:
   providing a vehicle with an associated implement;
   providing a vehicle guidance system having a vehicle position receiver;
   providing a swath generation apparatus (SGA) having a processing capability and an SGA memory device, the SGA being communicatively coupled to the guidance system;
   providing an operator input device;
   communicating a set of predetermined parameters to the SGA;
   defining within the SGA a coordinate system for vehicle position;
   calculating, by the processing capability of the SGA by an iterative process using the predetermined parameters, at least two end of row turn paths wherein each of the end of row turn paths vary in direction from the other and defined by a plurality of position data points, by connecting predefined end points of equally spaced swath paths, based on the predetermined parameters and an actual position of the vehicle; and
   providing an option to the operator to choose which end of row turn path for the vehicle to follow;
   and
   guiding the vehicle along the at least one planned end of row turn path.

2. The method of claim 1 wherein the predetermined parameters include at least one of a minimum turning radius of vehicle and associated implement, a rate of change of the curvature of the vehicle, a minimum depth of an end of row turn, and headland swath path dimensions.

3. The method of claim 1 further comprising the steps of:
   displaying the vehicle path on a display device; and
   providing at least one of an audible or visual signal to notify an operator before making an end of row turn.

4. The method of claim 3 further comprising the step of:
   providing an option to manually guide the vehicle along at least one of the planned end of row turn and an alternate path.

5. The method of claim 4 wherein the step of providing an option to manually guide the vehicle along an alternate path includes providing a count down timer, and limiting a defined amount of time for an operator to decide whether to guide the vehicle along an alternate path.

6. The method of claim 1 wherein the step of calculating a planned vehicle path based on the predetermined parameters and the vehicle position includes interpolating data points along a non-linear path that is at least partially curved.

7. The method of claim 6 wherein the interpolated data points are spaced apart a minimum distance of 3 meters apart.

8. The method of claim 7 wherein the interpolated data points are spaced apart a maximum distance of 10 meters apart.

9. A method for vehicle guidance comprising the following steps:
   providing a vehicle with an associated implement;
   providing a vehicle guidance system having a vehicle position receiver;
   providing a swath generation apparatus (SGA) having a processing capability and an SGA memory device, the SGA being communicatively coupled to the guidance system;
   providing an operator input device;
   communicating a set of predetermined parameters to the SGA;
   defining within the SGA a coordinate system for vehicle position;
   calculating, by the processing capability of the SGA by an iterative process using the predetermined parameters, at least one planned end of row turn path defined by a plurality of position data points, by connecting predefined end points of equally spaced swath paths, based on the predetermined parameters and an actual position of the vehicle;
   displaying the vehicle path on a display device;
   providing a count down timer, and limiting a defined amount of time for an operator to decide whether to guide the vehicle along an alternate path;
   providing at least one of an audible or visual signal to notify an operator before making an end of row turn;
   providing an option to manually guide the vehicle along at least one of the planned end of row turn and an alternate path; and
   guiding the vehicle along the planned end of row turn path.

10. The method of claim 9 wherein the predetermined parameters include at least one of a minimum turning radius of vehicle and associated implement, a rate of change of the curvature of the vehicle, a minimum depth of an end of row turn, and headland swath path dimensions.

11. The method of claim 9 wherein the step of calculating a planned vehicle path based on the predetermined parameters and the vehicle position includes interpolating data points along a non-linear path that is at least partially curved.

12. The method of claim 11 wherein the interpolated data points are spaced apart a minimum distance of 3 meters apart.

13. The method of claim 12 wherein the interpolated data points are spaced apart a maximum distance of 10 meters apart.

14. A vehicle guidance system comprising:
a vehicle with an associated implement;
a vehicle guidance system having a vehicle position receiver;
a swath generation apparatus (SGA) having a processing capability and an SGA memory device, the SGA being communicatively coupled to the guidance system;
an operator input device being configured to receive a set of predetermined parameters to the SGA and define a coordinate system for vehicle position and determine at least one planned end of row turn path based on the predetermined parameters and the vehicle position;
an operator notification device configured to provide at least one of an audible or visual signal and a count down timer where the operator must determine to allow the guidance system to provide automatic guidance or use manual guidance of the vehicle; and
wherein the vehicle guidance system provides automatic guidance of the vehicle along the planned end of row turn path.

15. The system of claim 14 wherein the predetermined parameters include at least one of a minimum turning radius of vehicle and associated implement, a rate of change of the curvature of the vehicle, a minimum depth of an end of row turn, and headland swath path dimensions.

16. The system of claim 14 further comprising a visual display device being configured to display the at least one planned end of row turn path.

17. The system of claim 14 wherein the vehicle guidance system further provides an option to manually guide the vehicle along an alternate path and provides a count down timer limiting a defined amount of time for an operator to decide whether to guide the vehicle along the alternate path.

* * * * *